(12) United States Patent
Namba et al.

(10) Patent No.: US 8,784,963 B2
(45) Date of Patent: Jul. 22, 2014

(54) BRANCHED POLYCARBONATE

(75) Inventors: Nobutsugu Namba, Tokyo (JP); Hiroshi Hachiya, Tokyo (JP); Yoko Hachiya, legal representative, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 20 days.

(21) Appl. No.: 13/808,845

(22) PCT Filed: Jul. 5, 2011

(86) PCT No.: PCT/JP2011/065383
§ 371 (c)(1),
(2), (4) Date: Jan. 7, 2013

(87) PCT Pub. No.: WO2012/005250
PCT Pub. Date: Jan. 12, 2012

(65) Prior Publication Data
US 2013/0136883 A1 May 30, 2013

(30) Foreign Application Priority Data
Jul. 8, 2010 (JP) ................................. 2010-155952

(51) Int. Cl.
*B29D 22/00* (2006.01)
*B29D 23/00* (2006.01)
*B32B 1/08* (2006.01)
*B65D 1/02* (2006.01)
*C08G 64/42* (2006.01)
*C08G 64/06* (2006.01)

(52) U.S. Cl.
CPC .............. *C08G 64/42* (2013.01); *B65D 1/0207* (2013.01); *C08G 64/06* (2013.01)
USPC ....... 428/36.92; 428/35.7; 428/36.9; 525/462

(58) Field of Classification Search
USPC ...................... 428/35.7, 36.9, 36.92; 525/462
See application file for complete search history.

(56) References Cited

U.S. PATENT DOCUMENTS

| 4,562,242 | A | 12/1985 | Mark et al. |
| 5,589,564 | A | 12/1996 | Komiya et al. |
| 5,932,683 | A | 8/1999 | Hachiya et al. |
| 6,437,083 | B1 | 8/2002 | Brack et al. |
| 7,479,258 | B2 | 1/2009 | Fukuoka et al. |

FOREIGN PATENT DOCUMENTS

| CN | 1247553 A | 3/2000 |
| CN | 1531567 A | 9/2004 |
| JP | 5-271400 A | 10/1993 |
| JP | 5-295101 A | 11/1993 |
| JP | 2000-327768 A | 11/2000 |
| JP | 2001-302780 A | 10/2001 |
| JP | 2004-2831 A | 1/2004 |
| JP | 2005-97541 A | 4/2005 |
| JP | 2005-113119 A | 4/2005 |
| JP | 2005-511835 A | 4/2005 |
| JP | 2005-126494 A | 5/2005 |
| JP | 2005-146254 A | 6/2005 |
| JP | 2010-6943 A | 1/2010 |
| TW | I281479 B | 5/2007 |
| TW | 201005000 A | 2/2010 |
| WO | WO 97/32916 A1 | 9/1997 |
| WO | WO 03/050161 A1 | 6/2003 |
| WO | 2005/121210 A1 | 12/2005 |

OTHER PUBLICATIONS

Chinese Office Action dated Nov. 28, 2013 for Chinese Application No. 201180031537.9.
"Encyclopedia of Polymer Science and Technology", vol. 10, 1969, pp. 721-725.
Factor et al., "The Chemistry of [gamma]-irradiated bisphenol-A Polycarbonate", Polymer Degradation and Stability, vol. 45, 1994, pp. 127-137.
International Search Report mailed on Aug. 2, 2011, issued in PCT/JP2011/065383.
Seiichi Homma, "Polycarbonate Resin Handbook", The Nikkan Kogyo Shimbun, Ltd., 1992, p. 49.
International Preliminary Report on Patentability and Written Opinion issued Feb. 21, 2013. in PCT International Application No. PCT/JP2011/065383.
Office Action issued Jul. 4, 2013. in Taiwanese Patent Application No. 100123809.

*Primary Examiner* — Michael C Miggins
(74) *Attorney, Agent, or Firm* — Birch, Stewart, Kolasch & Birch, LLP

(57) ABSTRACT

A branched polycarbonate having a branching derived from a polyfunctional compound, comprising a repeating unit represented by general formula (1), a branched structure (a) derived from the polyfunctional compound and a branched structure (b) including at least one selected from the group consisting of branched structures represented by general formulas (2), (3) and (4), the total content of (a) and (b) with respect to (1) being 0.2-1.0 mol %, the ratio of (b) with respect to the total of (a) and (b) being 0.1-0.6, and the ratio of (2) with respect to the content of (b) being 0.5 or greater.

—O—Ar—O—C(=O)— (1)

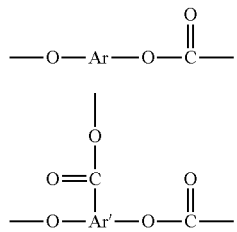
(2)

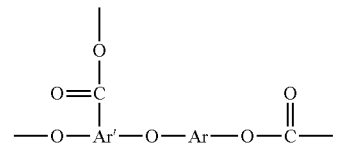
(3)

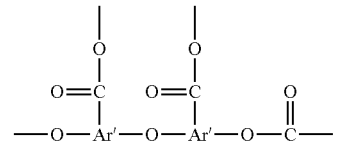
(4)

[In formulas, Ar represents a divalent aromatic residue and Ar' represents a trivalent aromatic residue.]

6 Claims, 1 Drawing Sheet

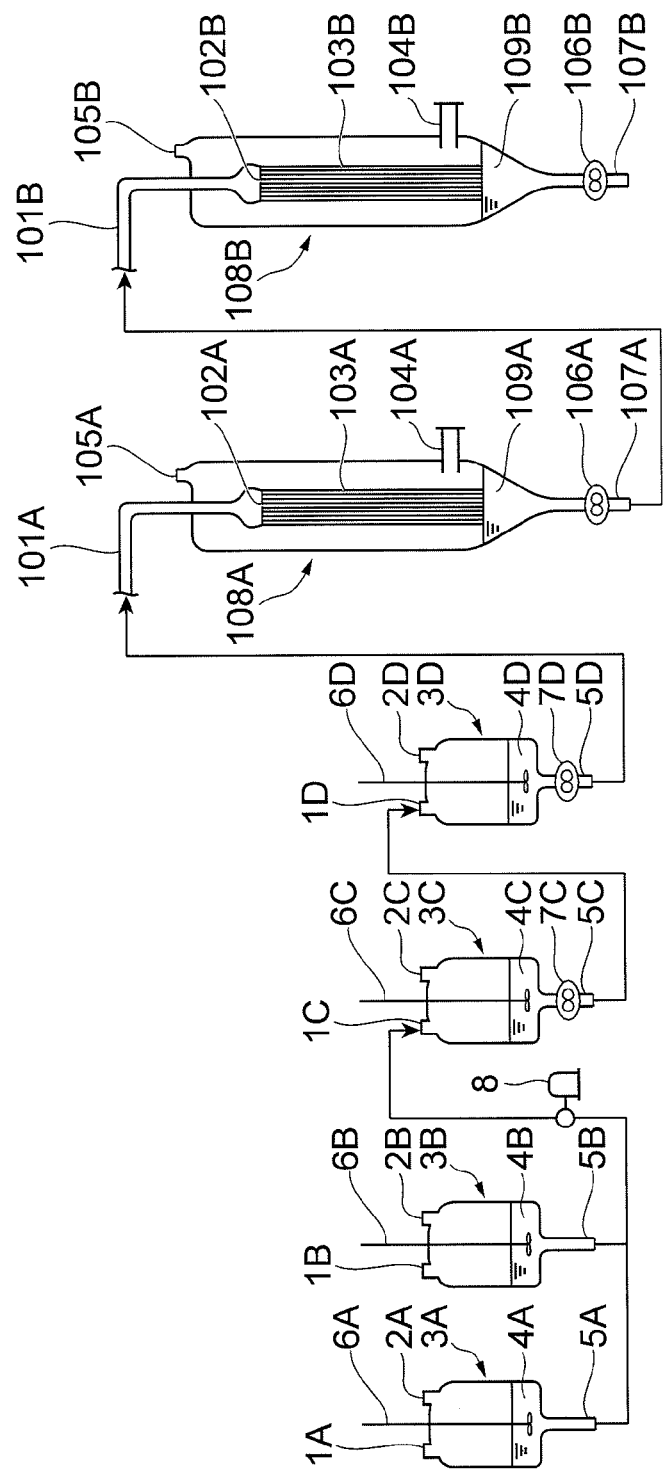

BRANCHED POLYCARBONATE

TECHNICAL FIELD

The present invention relates to a branched polycarbonate produced by transesterification. More specifically, it relates to a branched polycarbonate that can be suitably used for blow molding, extrusion molding, profile extrusion and hollow sheet forming.

BACKGROUND ART

Polycarbonates are resins with excellent transparency and heat resistance, as well as excellent mechanical strength including impact strength, and they are therefore used as engineering plastics in a numerous and wide variety of fields. In recent years, branched polycarbonates having a branched structure in the molecular chain are increasingly being used for their excellent molding properties for large-sized molded articles including blow molding of containers, and profile extrusion purposes.

Branched polycarbonates are produced by adding polyfunctional compounds such as trifunctional or tetrafunctional hydroxy compounds as branching agents for production of polycarbonates from aromatic dihydroxy compounds and phosgene. In recent years, non-phosgene methods, known as (melt) transesterification methods, have been a focus of interest as methods for producing polycarbonates, but because such production methods involve polymerization reaction at high temperature, they do not easily yield branched polycarbonates exhibiting the required properties.

In production of polycarbonates by transesterification, it is known that Kolbe-Schmitt reaction or reactions via production of isoalkenylphenols occur as side reactions during the polymerization process, forming branched structures in the polycarbonates (Non-patent documents 1 and 2). These side reactions can have major effects for the production of branched polycarbonates with satisfactory properties. Specifically, when a branched structure created by such a side reaction is introduced simultaneously with the branched structure resulting from the polyfunctional compound, it is possible to obtain a polycarbonate having a specific extent of branching, suitable for production of blow molded articles, but this is also accompanied by coloration that impairs the hue. In order to avoid such coloration, it has been attempted to inhibit such side reactions by using specific compounds such as nitrogen-containing basic compounds as catalysts, so that branched structures are introduced only from the added polyfunctional compounds (Patent documents 1 and 2).

As the complete reverse of this concept, there have been proposed methods of producing branched polycarbonates without using polyfunctional compounds as branching agents, and instead actively inducing side reactions to form branched structures (Patent documents 3-8).

CITATION LIST

Patent Literature

[Patent document 1] JP 05-271400 A
[Patent document 2] JP 05-295101 A
[Patent document 3] U.S. Pat. No. 4,562,242
[Patent document 4] JP 2004-2831 A
[Patent document 5] JP 2005-126494 A
[Patent document 6] JP 2005-113119 A
[Patent document 7] JP 2005-97541 A
[Patent document 8] JP 2005-146254 A

Non Patent Literature

[Non-patent document 1] Encyclopedia of Polymer Science and Technology, 10, 722 (1969)
[Non-patent document 2] Honma, S., Polycarbonate Handbook, 1992, Nikkan Kogyo Shimbun, Ltd.

SUMMARY OF INVENTION

Technical Problem

With attempts to inhibit side reactions and introduce branched structures only from added polyfunctional compounds, however, while it has been possible to prevent coloration by minimizing the branched structure caused by side reactions, the obtained branched polycarbonates tend to contain numerous fisheyes. Also, with attempts to actively induce side reactions to form branched structures without using polyfunctional compounds as branching agents, because such polymerization reactions are conducted at high temperatures of 280° C. or above to promote the side reactions, the obtained branched polycarbonates have poor hue and numerous fisheyes, while also exhibiting low impact strength.

The present invention has been accomplished in light of these circumstances, and its object is to provide a branched polycarbonate produced by transesterification, which has excellent impact resistance, low fisheyes and excellent hue, as well as improved moldability.

Solution to Problem

In order to solve the problems described above, the present inventors have carried out much diligent research on the relationship between impact resistance of polycarbonate branched structures, as well as fisheye generation and hue and moldability. As a result it was found, surprisingly, that a branched polycarbonate that solves all of these problems at once can be obtained by controlling the branched structure derived from side reactions and the branched structure derived from polyfunctional compounds to specific amounts and ranges.

The present invention is to be sharply distinguished from previous attempts aimed at achieving 100% of a certain specific branched structure. Specifically, the invention provides a branched polycarbonate having a branching derived from a polyfunctional compound having in the molecule at least 3 functional groups that are reactive with a carbonic acid diester, the branched polycarbonate having a repeating unit represented by general formula (1) on the main chain and branched chains and comprising a branched structure (a) derived from the polyfunctional compounds directly bonded to the main chain and branched chains and a branched structure (b) including at least one selected from the group consisting of branched structures represented by general formulas (2), (3) and (4), wherein the total amount of substance with branched structure (a) and branched structure (b) with respect to the amount of substance of the repeating unit represented by general formula (1) is 0.2-1.0 mol %, the ratio of the amount of substance with branched structure (b) with respect to the total amount of substance with branched structure (a) and branched structure (b) is 0.1-0.6, and the ratio of the amount of substance with the branched structure represented by general formula (2) with respect to the amount of substance with branched structure (b) is 0.5 or greater. Here, the term "amount of substance" refers to the amount of substance of the component derived from each structure produced during hydrolysis of the branched polycarbonate.

[Chemical Formula 1]

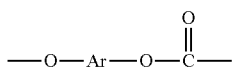

(1)

[Chemical Formula 2]

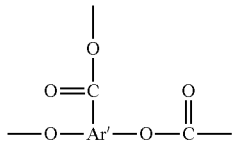

(2)

[Chemical Formula 3]

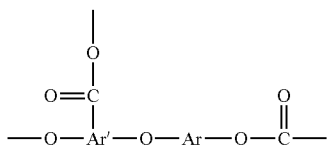

(3)

[Chemical Formula 4]

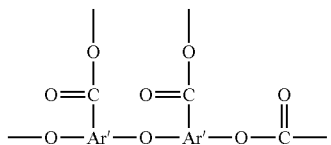

(4)

(In the formulas, Ar represents a divalent aromatic residue and Ar' represents a trivalent aromatic residue.)

The branched polycarbonate of the invention, having the structure described above, is a branched polycarbonate produced by transesterification, which can exhibit excellent impact resistance, low fisheyes and excellent hue, as well as improved moldability.

Preferably, the ratio of the amount of substance with the branched structure represented by general formula (4) with respect to the amount of substance with branched structure (b) is no greater than 0.25.

The polyfunctional compound is preferably a compound having at least 3 phenolic hydroxyl and/or carboxyl groups. This will further improve the properties of the branched polycarbonate of the invention.

According to the invention, the polyfunctional compound is preferably 1,1,1-tris(4-hydroxyphenyl)ethane and/or 4-[4-[1,1-bis(4-hydroxyphenyl)ethyl]-α,α-dimethylbenzyl]phenol, and the branched structures represented by general formulas (2), (3) and (4) are preferably the branched structures represented by formulas (5), (6) and (7), respectively. This will still further improve the properties of the branched polycarbonate of the invention.

[Chemical Formula 5]

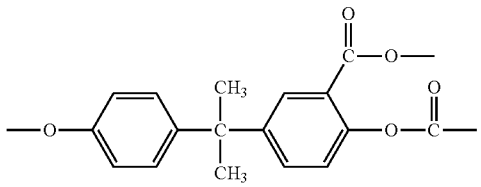

(5)

[Chemical Formula 6]

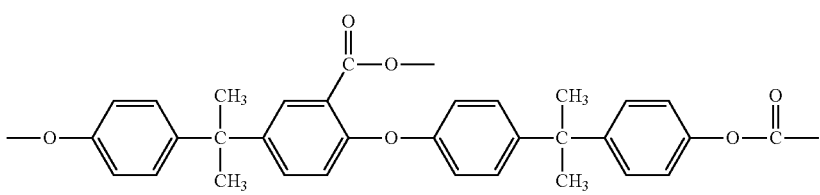

(6)

[Chemical Formula 7]

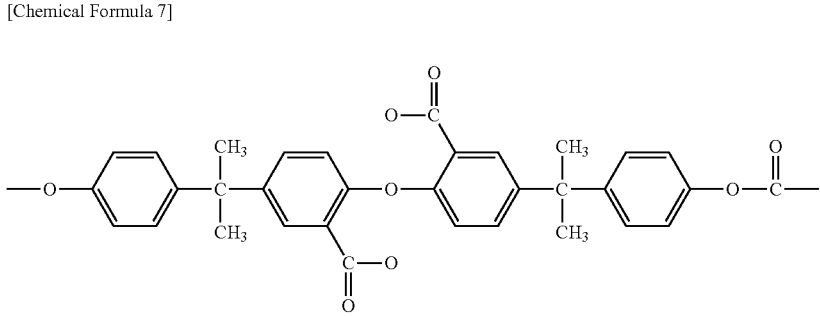

(7)

Further, the present invention provides a container obtained by blow molding the branched polycarbonates aforementioned.

Preferably, the container has the value of the maximum thickness divided by the minimum thickness ranges from 1.0 or more to less than 2.0, the thickness are measured following the face parallel to the bottom face of the container.

Advantageous Effects of Invention

According to the invention it is possible to provide branched polycarbonates that are produced by transesterification, and which have excellent impact resistance, low fisheyes and excellent hue, as well as suitability for the use for blow molding, extrusion molding and profile extrusion, especially for blow molding of containers such as large size water bottle of 5 to 30 liters.

BRIEF DESCRIPTION OF DRAWINGS

FIG. 1 is a schematic diagram of a system for production of a branched polycarbonate according to one embodiment of the invention.

DESCRIPTION OF EMBODIMENTS

The present invention will now be explained in greater detail. The branched polycarbonate of the embodiment can be produced by transesterification from an aromatic dihydroxy compound, a carbonic acid diester and a polyfunctional compound having in the molecule at least 3 functional groups that are reactive with the carbonic acid diester.

The branched polycarbonate of the embodiment has a repeating unit represented by general formula (1) on the main chain and branched chains.

[Chemical Formula 8]

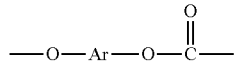

(1)

In the branched polycarbonate of the invention, the total amount of substance with branched structure (a) derived from the polyfunctional compound and branched structure (b) represented by general formulas (2), (3) and (4) (hereinafter which will be referred to as "(2) to (4)"), with respect to the amount of substance of the repeating unit represented by general formula (1), is 0.2-1.0 mol %, preferably 0.3-0.9 mol % and more preferably 0.3-0.8 mol %.

That is, total amount of a repeating unit represented by branched structures (a) and (b) with respect to 100 mol % of a repeating unit represented by general formulas (1) is 0.2-1.0 mol %, preferably 0.3-0.9 mol % and more preferably 0.3-0.8 mol %. Total amount of branched structures (a) and (b) greater than 1.0 mol % will lead to increase fisheyes and reduce impact resistance and mechanical strength, while an amount of less than 0.2 mol % will tend to lower the improving effect on moldability such that the effect of the invention may not be exhibited.

[Chemical Formula 9]

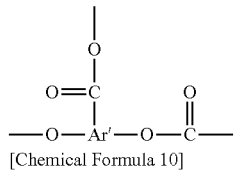

(2)

[Chemical Formula 10]

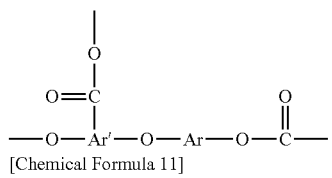

(3)

[Chemical Formula 11]

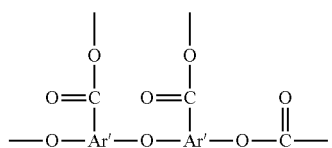

(4)

(In the formulas, Ar represents a divalent aromatic residue and Ar' represents a trivalent aromatic residue.)

Also, the ratio of the amount of substance with branched structure (b) with respect to the total amount of substance with branched structure (a) and branched structure (b) in the branched polycarbonate of the embodiment is 0.1-0.6, preferably 0.2-0.6 and even more preferably 0.3-0.6. If the ratio exceeds 0.6 the impact resistance and mechanical strength will tend to be reduced and a greater number of fisheyes produced, while if it is below 0.1 the effect of improving the moldability will tend to be reduced, such that the effect of the invention may not be exhibited.

The branched polycarbonate of the embodiment comprises a branched structure represented by general formulas (2) as an essential component. The ratio of the amount of substance with the branched structure represented by general formula (2) with respect to the amount of substance with branched structure (b) represented by general formulas (2) to (4) is 0.5 or greater, preferably 0.85 or greater and even more preferably 0.9 or greater. If it is below 0.5, the impact resistance and mechanical strength may be reduced and the number of fisheyes increased.

In addition to branched structure represented by general formula (2), the branched polycarbonate of the embodiment can also comprise a branched structure represented by general formula (3).

Also, the ratio of the amount of substance with the branched structure represented by general formula (4) with respect to the amount of substance with branched structure (b) in the branched polycarbonate of the embodiment is preferably no greater than 0.25, more preferably no greater than 0.05 and even more preferably no greater than 0.01. If the ratio of the amount of substance with the branched structure represented by general formula (4) is below 0.25, the impact resistance and hue will tend to increase further, and the number of fisheyes will tend to decrease further.

As used herein, the term "main chain" refers to the polymer chain formed by condensation of the aromatic dihydroxy compound and carbonic acid diester, used as starting materials, by the transesterification reaction. Specifically, at the sections branched by the polyfunctional compound ("branched structure (a)"), the branched chain with the longest section at the branched end is selected from among the multiple branched chains that are present and it is defined as the main chain.

As used herein, the term "branched structure (a)" refers to a branched structure due to branching by the polyfunctional compound. For example, when 1,1,1-tris(4-hydroxyphenyl) ethane is used as the polyfunctional compound, "branched structure (a)" is the structure represented by the following formula.

[Chemical Formula 12]

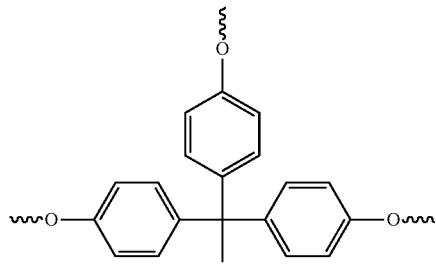

As used herein, the term "branched structure (b)" refers to a branched structure that is spontaneously produced on the main chain during the branched polycarbonate production process (for example, Fries rearrangement).

An aromatic dihydroxy compound is a compound represented by HO—Ar—OH, for example (wherein Ar is a divalent aromatic residue, and may be, for example, phenylene, naphthylene, biphenylene, pyridylene or a divalent aromatic residue represented by —$Ar^1$—Y—$Ar^2$—, where $Ar^1$ and $Ar^2$ each independently represent a C5-70 divalent carbocyclic or heterocyclic aromatic group, and Y represents a C1-30 divalent alkylene group).

Ar in formulas (1) and (3) has the same definition as Ar in HO—Ar—OH. Also, Ar' in formulas (2), (3) and (4) each represent a trivalent aromatic residue with an additional hydrogen or the like removed from Ar for bonding of the substituent (for example, —COO—) that is to be present at the branching origin.

In the divalent aromatic group ($Ar^1$, $Ar^2$), the one or more hydrogens bonded to the aromatic ring may be optionally replaced with another substituent that does not adversely affect the reaction, such as a C1-10 alkyl, C1-10 alkoxy, phenyl, phenoxy, vinyl, cyano, ester, amide or nitro group. Specific examples of preferred heterocyclic aromatic groups include heterocyclic aromatic groups having one or more nitrogen atoms, oxygen atoms or sulfur atoms composing the ring.

The divalent alkylene group Y is an organic group represented by the following general formulas.

[Chemical Formula 13]

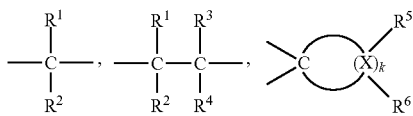

(In the formulas, $R^1$, $R^2$, $R^3$ and $R^4$ each independently represent hydrogen, C1-10 alkyl, C1-10 alkoxy, a C5-10 cycloalkyl group composing a ring, a C5-10 carbocyclic aromatic group composing a ring or a C6-10 carbocyclic aralkyl group composing a ring. Also, k represents an integer of 3-11, $R^5$ and $R^6$ are individually selected for each X and each independently represents hydrogen or a C1-6 alkyl group, and X represents carbon. The one or more hydrogens in $R^1$, $R^2$, $R^3$, $R^4$, $R^5$ and $R^6$ may be optionally replaced with another substituent that does not adversely affect the reaction, such as a C1-10 alkyl, C1-10 alkoxy, phenyl, phenoxy, vinyl, cyano, ester, amide or nitro group.)

Examples for the divalent aromatic residue Ar having such substituents include groups represented by the following general formulas.

[Chemical Formula 14]

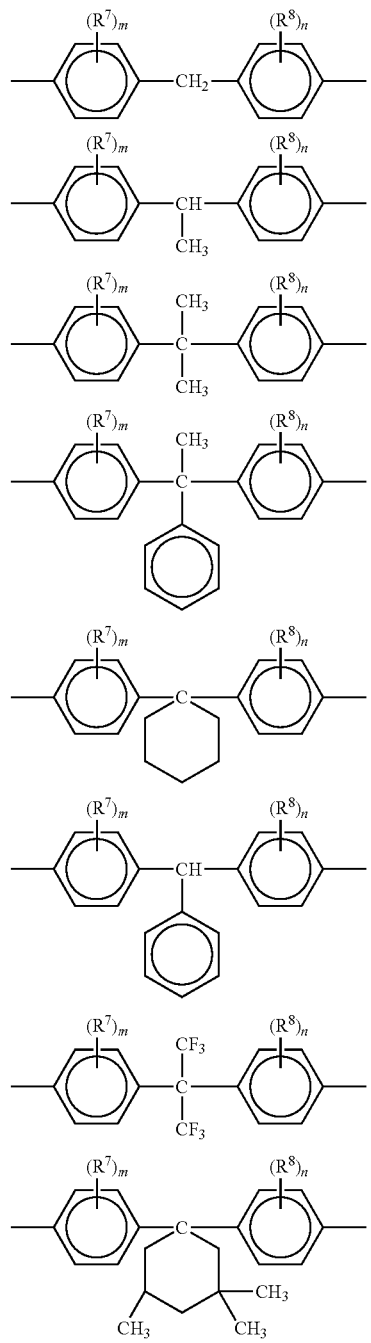

-continued

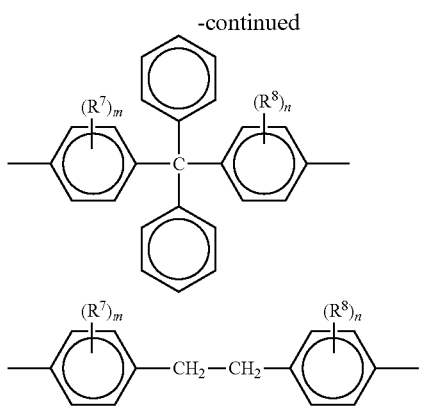

(In the formulas, $R^7$ and $R^8$ each independently represent hydrogen, C1-10 alkyl, C1-10 alkoxy, phenyl, phenoxy, vinyl, cyano, ester, amide, nitro or the like, m and n each represent an integer of 1-4, when m is 2-4 each $R^7$ may be the same or different, and when n is 2-4 each $R^8$ may be the same or different.)

The divalent aromatic residue Ar may be one represented by —$Ar^1$—Z—$Ar^2$— (where $Ar^1$ and $Ar^2$ are as defined above, Z is a single bond or a divalent group such as —O—, —CO—, —S—, —$SO_2$—, —SO—, —COO— or —CON($R^1$)—, and $R^1$ is as defined above).

Examples for such a divalent aromatic residue Ar include groups represented by the following general formulas.

[Chemical Formula 15]

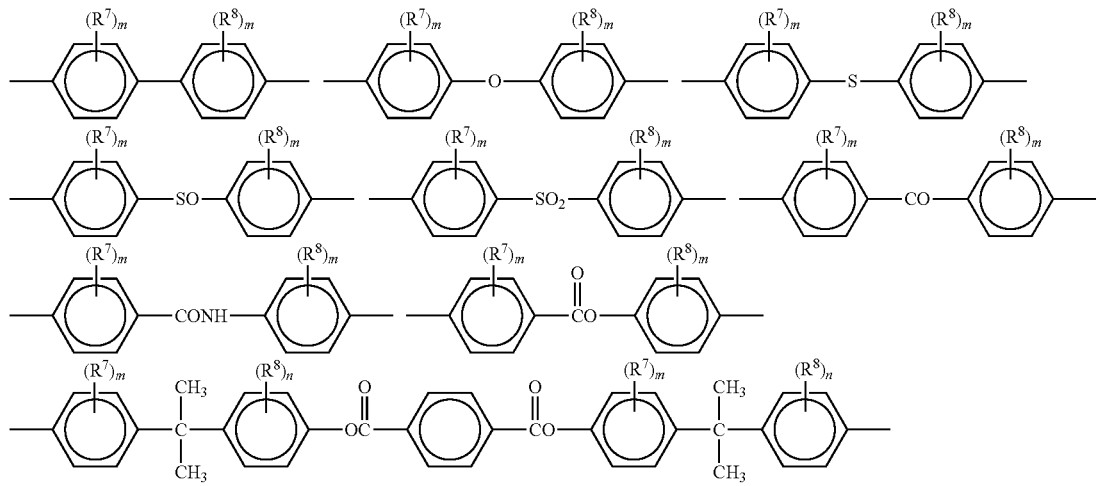

(In the formulas, $R^7$, $R^8$, m and n have the same definitions as above.)

The aromatic dihydroxy compound used for the embodiment may be a single type or two or more different types. A typical example of an aromatic dihydroxy compound is bisphenol A, and when it is used together with another aromatic dihydroxy compound, bisphenol A is preferably used in a proportion of at least 85 mol % with respect to the entire amount of aromatic dihydroxy compounds. These aromatic dihydroxy compounds preferably have low contents of chlorine and alkali or alkaline earth metals, and if possible they are preferably essentially free of such elements.

The carbonic acid diester used for the embodiment is a compound represented by the following general formula, for example.

[Chemical Formula 16]

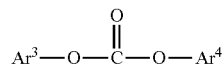

(In the formula, $Ar^3$ and $Ar^4$ each represent a monovalent aromatic group.)

The monovalent aromatic groups $Ar^3$ and $Ar^4$ are preferably phenyl, naphthyl, biphenyl or pyridyl groups. In $Ar^3$ and $Ar^4$, the one or more hydrogens bonded to the aromatic ring may be optionally replaced with another substituent that does not adversely affect the reaction, such as a C1-10 alkyl, C1-10 alkoxy, phenyl, phenoxy, vinyl, cyano, ester, amide or nitro group. $Ar^3$ and $Ar^4$ may be the same or different.

More preferred examples for $Ar^3$ and $Ar^4$ include groups represented by the following formulas.

[Chemical Formula 17]

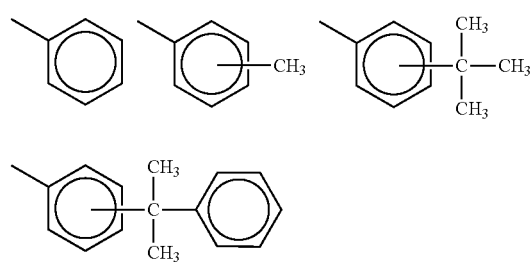

-continued

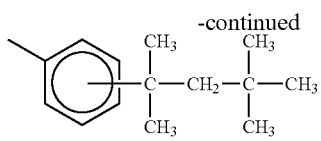

Typical examples of carbonic acid diesters include substituted or unsubstituted diphenyl carbonates represented by the following general formula.

[Chemical Formula 18]

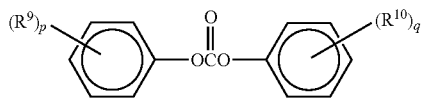

(In the formula, $R^9$ and $R^{10}$ each independently represent hydrogen, C1-10 alkyl, C1-10 alkoxy, a C5-10 cycloalkyl group composing a ring or a phenyl group, p and q each represent an integer of 1-5, when p is 2 or greater each $R^9$ may be different, and when q is 2 or greater each $R^{10}$ may be different.)

Of these carbonic acid diesters, symmetrical diaryl carbonates including unsubstituted diphenyl carbonates and lower alkyl-substituted diphenyl carbonates such as ditolyl carbonate and di-t-butylphenyl carbonate are preferred, with diphenyl carbonate being more preferred. These carbonic acid diesters may be used alone or in combinations of two or more. These carbonic acid diesters preferably have low contents of chlorine and alkali or alkaline earth metals, and if possible they are preferably free of such elements.

The proportion of the aromatic dihydroxy compound and carbonic acid diester used (the charging ratio) will depend on the type of aromatic dihydroxy compound and carbonic acid diester used, the target molecular weight, the hydroxyl termination ratio and the polymerization conditions, and it is not particularly restricted. The carbonic acid diester may be used in a proportion of preferably 0.9-2.5 mol, more preferably 0.95-2.0 mol and even more preferably 0.98-1.5 mol with respect to 1 mol of the aromatic dihydroxy compound. An aromatic monohydroxy compound may also be used for terminal conversion or molecular weight modification.

Examples of polyfunctional compounds having in the molecule at least 3 functional groups that are reactive with the carbonic acid diester, for use according to the embodiment, include 1,1,1-tris(4-hydroxyphenyl)ethane, 4-[4-[1,1-bis(4-hydroxyphenyl)ethyl]-α,α-dimethylbenzyl]phenol, 2,2',2"-tris(4-hydroxyphenyl)diisopropylbenzene, α,α',α"-tris(4-hydroxyphenyl)triisopropylbenzene, fluoroglycine, 4,6-dimethyl-2,4,6-tri(4-hydroxyphenyl)heptane-2,1,3,5-tri(4-hydroxyphenyl)benzole, 2,2'-bis-[4,4-(4,4'-dihydroxydiphenyl)cyclohexyl]propane, α-methyl-α,α',α'-tris(4-hydroxyphenyl)-1,4-diethylbenzene, tri-(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)phenyl)terephthalic acid ester, tetra-(4-hydroxyphenyl)methane, tetra-(4-(4-hydroxyphenylisopropyl)phenoxy)methane, 1,4-bis(4',4"-dihydroxy-triphenyl)methylbenzene, 2,4-dihydroxybenzoic acid, trimesic acid, 3,3-bis(3-methyl-4-hydroxyphenyl)-2-oxo-2,3-dihydroindole, trimesic trichloride, α,α',α"-tris(4-hydroxyphenol)-1,3,5-triisopropylbenzene, trimellitic acid, 1,3,5-benzenetricarboxylic acid, pyromellitic acid, $C_6H_5$—Si—(O—Si(CH_3)_2—C_3H_6—C_6H_4—OH)_3, CH_3—Si—(O—Si(CH_3)_2—C_3H_6—C_6H_4—OH)_3 and the like, with 1,1,1-tris(4-hydroxyphenyl)ethane and 4-[4-[1,1-bis(4-hydroxyphenyl)ethyl]-α,α-dimethylbenzyl]phenol being most preferred.

The amount of polyfunctional compound used with respect to the aromatic dihydroxy compound may be preferably 0.1-0.95 mol %, more preferably 0.2-0.8 mol % and most preferably 0.3-0.6 mol %. If it is no greater than 0.95 mol %, this will not tend to increase fisheyes, while the melt tension increases with an amount of at least 0.1 mol %.

Transesterification is a method in which the compound is polycondensed by transesterification reaction in a molten state in the presence or in the absence of a catalyst, while heating under reduced pressure and/or an inert gas flow, and the polymerization method has no restrictions in terms of the apparatus used. For example, the compounds can be easily produced alone or in combinations using an agitating tank reactor, a thin-film reactor, a centrifugal thin-film evaporation reactor, a surface-renewal biaxial kneading reactor, a biaxial horizontal stirring reactor, a wetted-wall reactor, a perforated-plate reactor that accomplishes polymerization while dropping freely or a wire-attached perforated-plate reactor that accomplishes polymerization while dropping along a wire. There are no particular restrictions on the materials of such reactors, but at least the material composing the inner wall surface of the reactor is usually selected to be stainless steel, nickel, glass or the like.

The range for the reaction temperature (polymerization temperature) in the method of producing a branched polycarbonate according to the embodiment is preferably 50-275° C., more preferably 100-273° C., even more preferably 130-273° C. and most preferably 150-270° C., to obtain a practical reaction rate, inhibit production of repeating units represented by general formulas (3) and (4), and from the viewpoint of coloration and thermostability of the obtained polycarbonate. According to the invention, preferably the molten prepolymer is first produced with a stirred-tank polymerization reactor, and the obtained molten prepolymer is further polymerized using a perforated-plate reactor that accomplishes polymerization while dropping freely, and a wire-contact fluidized polymerization reactor that accomplishes polymerization while dropping along a wire. These production methods may be carried out with reference to U.S. Pat. No. 5,589,564, for example.

According to the embodiment, first the aromatic dihydroxy compound and carbonic acid diester are subjected to melt condensation to produce a polycarbonate prepolymer (molten prepolymer). From the viewpoint of the number of fisheyes of the branched polycarbonate, and the impact resistance, mechanical strength, number of fisheyes due to polyfunctional compound dispersion, as well as improving moldability, the polyfunctional compound is preferably added at the point when the number-average molecular weight (Mn) of the polycarbonate prepolymer has reached 1000-7000, more preferably at the point when it has reached Mn=1500-6000, and even more preferably at the point when it has reached Mn=1800-5000.

The aromatic monohydroxy compound is produced as the polymerization reaction proceeds, and the reaction rate increases when the product is removed from the reaction system. Thus, it is preferred to use a method in which an inert gas that does not adversely affect the reaction, such as nitrogen, argon, helium, carbon dioxide or a lower hydrocarbon gas, is introduced and the aromatic monohydroxy compound that is produced is removed together with the gas, or a method in which the reaction is conducted under reduced pressure. The preferred reaction pressure will differ depending on the molecular weight of the product, but it is preferably between 10 mmHg and ordinary pressure at the first stage of polymerization, preferably no greater than 20 mmHg and most preferably no greater than 10 mmHg in the last stage of polymerization, and preferably no greater than 5 mmHg in the final reactor.

The branched polycarbonate of the embodiment preferably contains essentially no chlorine. As described in International Patent Publication No. WO2005/121210, when a branched polycarbonate has been produced from an aromatic dihydroxy compound, a carbonic acid diester and a polyfunctional compound containing essentially no chlorine in this transesterification process, a branched polycarbonate can be obtained having a chlorine content of no greater than 10 ppb and preferably no greater than 1 ppb, so long as no other chlorine-containing compound is added.

From the view point of the moldability, the MI (melt index) value of the branched polycarbonate according to the embodiment, which is measured according to ASTM D1238 with a temperature of 300° C. and a load of 1.2 kg, is preferably 0.5-7 g/10 min and more preferably 1-6 g/10 min, and most preferably 2-4 g/10 min. If MI is in the range of 0.5-7 g/10 min, moldability and the property of drawdown are more improved.

Upon molding a film with a thickness of 50 μm and a width of 30 cm, the branched polycarbonate of the embodiment has no more than 100, preferably no more than 80 and even more preferably no more than 60 fisheyes of sizes greater than 300 μm in a 1 m length at an arbitrarily selected location. The number of fisheyes may be counted as molding the container (a water bottle, etc.); however, since the water bottle generally has parts processed by surface texturing and has a few smooth areas, and further has a thicker thickness compared to the film, it is more preferable to evaluate as molding the film.

In the container obtained by molding the branched polycarbonate of the embodiment, when it is measured along the surface parallel to the bottom surface for the thickness, the range of the value obtained by dividing the largest thickness by the smallest thickness is preferred to be 1.0 or more to less than 2.0. When the value is 2.0 or more, it indicates a large unevenness in the thickness and it may cause the container to deform or the impact resistance to decrease. The thickness above is obtained by measuring variability of thicknesses in the surface orthogonal to the line connecting the centers of the opening of the container and the bottom surface.

The hue (b* value) of the branched polycarbonate of the embodiment is 0-3.0, preferably 0-2.5 and even more preferably 0-1.5.

Measurement of the hue of the branched polycarbonate of the embodiment may be determined by injection molding a flat plate with a thickness of 3.2 mm at a barrel temperature of 300° C. and a mold temperature of 90° C. and placing it on the white calibration plate of a CR-400 by Konica Minolta Holdings, Inc. for measurement by the reflection method with a measuring diameter of 8 mm, determining the difference in b* value with respect to the white calibration plate (flat plate b* value=measured value with flat plate on white calibration plate−measured value of white calibration plate).

The branched structures (a) and (b) in the branched polycarbonate may be determined by complete hydrolysis of the branched polycarbonate and reversed-phase liquid chromatography. Hydrolysis of the polycarbonate may be accomplished by ordinary temperature hydrolysis as described in Polymer Degradation and Stability 45 (1994), 127-137, which is preferred because it has an easy procedure and no side reactions during the decomposition, while allowing complete hydrolysis of the polycarbonate, and according to the invention it may be carried out at room temperature (25° C.).

If necessary, a coloring agent, heat-resistant stabilizer, antioxidant, weatherproofing agent, ultraviolet absorber, release agent, lubricant, antistatic agent, plasticizer or the like may be added to the branched polycarbonate of the embodiment. Such additives may be added after completion of the polymerization while the polycarbonate-based resin is still in the molten state, or the polycarbonate may be pelletized first and the additives subsequently added prior to remelting and kneading.

A mode for producing a branched polycarbonate of the invention will now be explained with reference to FIG. 1.

The system for production of the branched polycarbonate shown in FIG. 1 comprises a first stirred polymerization step with stirred-tank first polymerization reactors 3A, 3B, a second stirred polymerization step with a stirred-tank second polymerization reactor 3C and a third stirred polymerization step with a stirred-tank third polymerization reactor 3D, as well as a first wire-contact fluidized polymerization step with a wire-contact fluidized first polymerization reactor 108A and a second wire-contact fluidized polymerization step with a wire-contact fluidized second polymerization reactor 108B.

The stirred-tank polymerization reactors 3A-3D each comprise polymerization material inlets 1A, 1B or prepolymer inlets 1C, 1D, vent ports, 2A-2D, outlets 5A-5D and stirrers 6A-6D with anchored stirring blades. The first stirred polymerization step is carried out in a batch system, with, among the polymerization materials, the aromatic dihydroxy compound and carbonic acid diester being loaded into the stirred-tank first polymerization reactors 3A and 3B configured in parallel. The produced molten prepolymers 4A and 4B are loaded through a transport tube into the stirred-tank second polymerization reactor 3C through the prepolymer inlet 1C. During this time, a transport pump 8 installed along the transport path may be used if necessary for transport of the molten prepolymers 4A and 4B. In addition, the molten prepolymer 4C undergoing polymerization in the second stirred polymerization step is pushed out by a transport pump 7C provided at the outlet 5C of the stirred-tank second polymerization reactor 3C, and loaded from the prepolymer inlet 1D into the stirred-tank third polymerization reactor 3D through a transport tube. Thus, the second and third stirred polymerization steps are carried out continuously.

The molten prepolymer 4D produced in the third stirred polymerization step is pushed out from the outlet 5D of the stirred-tank third polymerization reactor 3D by a transport pump 7D, and is transported through a transport tube to the wire-contact fluidized first polymerization reactor 108A.

The first and second wire-contact fluidized polymerization steps are then conducted continuously at the wire-contact fluidized first and second polymerization reactors 108A, 108B. Each of the wire-contact fluidized first and second polymerization reactors 108A, 108B is provided with prepolymer inlets 101A, 101B, perforated plates 102A, 102B, wire guides 103A, 103B, gas supply ports 104A, 104B, vent ports 105A, 105B and outlets 107A, 107B.

The molten prepolymer 4D loaded from the prepolymer inlet 101A undergoes polymerization while dropping in contact with the wire, and the molten prepolymer 109A accumulates at the bottom of the wire-contact fluidized first polymerization reactor 108A. The molten prepolymer 109A is pushed out from the outlet 107A by the transport pump 106A, and is transported through a transport tube to the prepolymer inlet 101B of the wire-contact fluidized second polymerization reactor 108B.

The polyfunctional compound is loaded in through an inlet (not shown) provided between 107A and 101B. The molten prepolymer 109A that has been loaded into the wire-contact fluidized second polymerization reactor 108B undergoes polymerization while dropping in contact with the wire, as in the wire-contact fluidized first polymerization reactor 108A, and the molten polymer 109B accumulates at the bottom of the wire-contact fluidized second polymerization reactor 108B. The molten polymer 109B is discharged from the outlet 107B by a discharge pump 106B, and is collected as a branched polycarbonate.

At the time of adding the polyfunctional compound, the polyfunctional compound may be added in a molten state, or dissolved in a solvent for addition if it is in a powder state. In order to reduce fisheyes and improve hot water resistance, the polyfunctional compound is preferably added in a molten state or dissolved in a solvent, and most preferably it is added in a solvent-dissolved state. The solvent used to dissolve the polyfunctional compound is preferably a compound present in the industrial plant, such as a phenol, carbonic acid diester, ketones, ethers, a mixture or the reaction product of an aromatic dihydroxy compound and a carbonic acid diester, or a low molecular weight polycarbonate with a number-average molecular weight of no greater than 5000. Using such compounds as solvents can improve the impact strength of containers obtained by molding the branched polycarbonate. While the reason for this is not fully understood, it is believed that using such compounds as solvents may cause depolymerization of the polycarbonate and thus further promote dispersion of the polyfunctional compound. In this case, the molecular weight of the polycarbonate will temporarily fall due to the depolymerization, and since it is not desirable in terms of production for the molecular weight reduction to be too large, the amount of solvent is preferably determined so that the percentage of molecular weight reduction is below 50% and more preferably below 30%. The solvent for dissolution of the polyfunctional compound may be added as a solution of methanol, ethanol, acetone, methylene chloride or the like in a general purpose solvent.

In addition, the term "polyfunctional compound in a liquid state" refers either to a state in which the polyfunctional compound itself is molten, or to a state in which the polyfunctional compound is dissolved in a solvent.

According to this embodiment, the range of ΔT (° C.) defined by the following formula (I) is preferably between −20° C. and 20° C., from the viewpoint of impact strength, hue and gel generation with the obtained branched polymer.

$$\Delta T = T_2 - T_1 \quad (I)$$

Here, $T_1$ represents the temperature (° C.) of the low molecular weight polycarbonate introduced into the final polymerization reactor in step (C) and $T_2$ represents the temperature (° C.) of the branched polycarbonate polymerized by the final polymerization reactor in step (C), with $T_2$ being no higher than 285° C.

$T_2$ is preferably 250° C.-285° C. and more preferably 260° C.-275° C. The term "final polymerization reactor" is the polymerization reactor in which the reaction is conducted up to a branched polycarbonate MI of no greater than 10 g/10 min.

In common melt polymerization methods, the viscosity of the polymer in the final polymerization reactor corresponding to step (C) of this embodiment rises with increasing molecular weight, making it necessary to significantly increase the reactor temperature to lower the viscosity. By using a vertical polymerization reactor as the final polymerization reactor for the process of this embodiment, it is possible to obtain a branched polycarbonate with very excellent physical properties and quality while having high viscosity that has not been hitherto obtainable.

EXAMPLES

The invention will now be explained in greater detail by examples and comparative examples. However, the invention is not limited to the examples described below.

The evaluated properties were measured by the following methods.

(1) Number-average molecular weight: This was measured by gel permeation chromatography (HLC-8320GPC by Tosoh Corp., 2 TSK-GEL Super Multipore HZ-M columns, RI detector), with a tetrahydrofuran eluent and a temperature of 40° C. The molecular weight was determined from a calibration curve for standard monodisperse polystyrene (EasiVial, product of Varian Inc.) using an equivalent molecular weight calibration curve based on the following formula.

$$M_{PC} = 0.3591 M_{PS}^{1.0388}$$

(In the formula, $Mp_c$ is the molecular weight of the polycarbonate and $M_{PS}$ is the molecular weight of polystyrene.)

(2) MI (melt index) was measured according to ASTM D1238, with a temperature of 300° C. and a load of 1.2 kg.

(3) Extent of branched structure: After dissolving 55 mg of the branched polycarbonate in 2 ml of tetrahydrofuran, 0.5 ml of a 5N potassium hydroxide-methanol solution was added and the mixture was stirred at 25° C. for 2 hours to complete hydrolysis. Next, 0.3 ml of concentrated hydrochloric acid was added and the extent of the branched structure was measured by reversed-phase liquid chromatography (LC-1100, product of Agilent). The reversed-phase liquid chromatography was carried out using an Inertsil ODS-3 column (registered trademark of GL Sciences, Inc.) with a mixed eluent comprising methanol and 0.1% aqueous phosphoric acid, with a column oven at 40° C., and the methanol/0.1% phosphoric acid aqueous solution ratio at a gradient starting from 20/80 to 100/0. The detection was performed using an UV detector at a wavelength of 300 nm, and quantitation was performed from the extinction coefficient of the standard substance.

(4) Hue: This was determined by injection molding a flat plate with a thickness of 3.2 mm at a barrel temperature of 300° C. and a mold temperature of 90° C. and placing it on the white calibration plate of a CR-400 by Konica Minolta Holdings, Inc. for measurement by the reflection method with a measuring diameter of 8 mm, determining the difference in b* value with respect to the white calibration plate (flat plate b* value=measured value with flat plate on white calibration plate−measured value of white calibration plate).

(5) Fisheyes: A film with a thickness of 50 μm and a width of 30 cm was molded using a film-forming machine by Tanabe Plastics Machinery Co., Ltd. (30 mmφuniaxial, screw rotational speed: 100 rpm, barrel temperature: 280° C., T-die temperature: 260° C., roll temperature: 120° C.), and the number of fisheyes with sizes of at least 300 μm within an arbitrarily selected 1 m length was visually counted.

(6) Moldability: An ASB-650EXHS injection blow molding machine by Nissei ASB Machine Co., Ltd. was used for injection blow molding of a 5-gallon water bottle (diameter: approximately 25 cm, height: approximately 50 cm) at a barrel temperature of 295° C., a mold core temperature of 60° C. and a cavity temperature of 30° C., and the presence or absence of non-uniform sections in the water bottle was evaluated. The non-uniformity was evaluated by measuring the thickness at 32 locations at non-surface-textured sections of the water bottle body (sections at 12 cm and 25 cm from the bottom) at equal spacing along the horizontal direction (on the circumference), and determining the value at each location (maximum thickness/minimum thickness). (Good (A): Maximum thickness/minimum thickness 1.0-less than 2.0, Fair (B): maximum thickness/minimum thickness 2.0-less than 5.0, Poor (C): maximum thickness/minimum thickness 5.0 or greater or cracks in bottle)

(7) Impact Strength (7-a) Bottle strength: The water bottle molded in (6) was filled with water, and the bottle was dropped from a height of 1.5 m in 4 orientations (upright, inverted, oblique upright and oblique inverted), upon which the presence or absence of cracks was evaluated. (Good (A): No cracks, Poor (C): Cracks, (–): No evaluation possible due to failure to mold bottle.)

(7-b) Charpy strength: A test piece was prepared by injection molding according to ISO 306 at a barrel temperature of 300° C. and a mold temperature of 90° C., and testing was conducted by notching.

Example 1

The production system illustrated in FIG. 1 was used to produce a polycarbonate. The stirred-tank first polymerization reactors 3A and 3B having an internal volume of 100 liters were provided with stirrers 6A, 6B each having an anchored stirring blade. The stirred-tank second polymerization reactor 3C and stirred-tank third polymerization reactor 3D having a volume of 50 liters were provided with stirrers 6C, 6D each having an anchored stirring blade. The wire-contact fluidized first and second polymerization reactors 108A, 108B held perforated plate 102A with 5 holes and perforated plate 102B with 3 holes, and SUS316L wire guides 103A, 103B of 1 mm diameter, 8 m length. The stirred-tank first polymerization reactors 3A and 3B were used with alternated switching, and from the stirred-tank second polymerization reactor 3C onward were used continuously.

An 80 kg portion of polymerization material comprising bisphenol A as the aromatic dihydroxy compound and diphenyl carbonate as the carbonic acid diester (at a molar ratio of 1.06 with respect to the bisphenol A), and a disodium salt of bisphenol A as the catalyst (70 ppb by weight with respect to the bisphenol A in the polymerization material, based on sodium atoms), were charged into the stirred-tank first polymerization reactor 3A through the polymerization material inlet 1A. Stirring was conducted with a reaction temperature of 180° C., a reaction pressure of atmospheric pressure and a nitrogen gas flow rate of 1 liter/hr. The outlet 5A was opened after 4 hours, and the molten prepolymer 4A was fed into the stirred-tank second polymerization reactor 3C at a flow rate of 5 liter/hr.

Next, the stirred-tank first polymerization reactor 3B was operated in the same manner as the stirred-tank first polymerization reactor 3A, to obtain a molten prepolymer 4B. After the stirred-tank first polymerization reactor 3A became empty, the outlet 5A of the stirred-tank first polymerization reactor 3A was closed and the outlet 5B of the stirred-tank first polymerization reactor 3B was opened, and the molten prepolymer 4B was fed from the stirred-tank first polymerization reactor 3B into the stirred-tank second polymerization reactor 3C at a flow rate of 5 liter/hr. This was repeated for alternating continuous supply of the molten prepolymers 4A and 4B into the stirred-tank second polymerization reactor 3C.

The stirred-tank second polymerization reactor 3C was kept at a reaction temperature of 230° C. and a reaction pressure of 13.3 kPa to obtain a molten prepolymer 4C. After the volume of the molten prepolymer 4C reached 20 liters, a portion of the molten prepolymer 4C was continuously extracted and fed to the stirred-tank third polymerization reactor 3D, to maintain a constant internal volume of 20 liters.

The stirred-tank third polymerization reactor 3D was kept at a reaction temperature of 265° C. and a reaction pressure of 2.66 kPa to obtain a molten prepolymer 4D. After the volume of the molten prepolymer 4D reached 20 liters, a portion of the molten prepolymer 4D was continuously extracted and fed to the wire-contact fluidized first polymerization reactor 108A, to maintain a constant internal volume of 20 liters.

The wire-contact fluidized first polymerization reactor 108A was kept at a reaction temperature of 265° C. and a reaction pressure of 800 Pa to obtain a molten prepolymer 109A. After the volume of the molten prepolymer 109A reached 10 liters, a portion of the molten prepolymer 109A was continuously extracted and fed to the wire-contact fluidized second polymerization reactor 108B, to maintain a constant volume of 10 liters.

The polyfunctional compound 1,1,1-tris(4-hydroxyphenyl)ethane was continuously added between the outlet 107A of the wire-contact fluidized first polymerization reactor 108A and the prepolymer inlet 101B, in an amount for a molar ratio of 0.004 with respect to the bisphenol A in the molten prepolymer 109A.

The wire-contact fluidized second polymerization reactor 108B was kept at a reaction temperature of 265° C. and a reaction pressure of 120 Pa, to obtain a branched polycarbonate 109B. After the volume of the branched polycarbonate 109B reached 10 liters, a discharge pump 106B was used for continuous extraction as a strand from the outlet 107B, to maintain a constant volume of 10 liters, and after cooling it was cut to obtain a pelletized branched polycarbonate.

Example 2

A pelletized branched polycarbonate was obtained in the same manner as Example 1, except that the amount of the polyfunctional compound 1,1,1-tris(4-hydroxyphenyl)ethane was in a molar ratio of 0.003 with respect to the bisphenol A, the molten prepolymer 4A was fed to a stirred-tank second polymerization reactor 3C with a volume of 50 liter at a flow rate of 3 liter/hr, and the reaction pressure in the stirred-tank third polymerization reactor 3D, wire-contact fluidized first polymerization reactor 108A and wire-contact fluidized second polymerization reactor 108B was 250 Pa.

Example 3

A pelletized branched polycarbonate was obtained in the same manner as Example 1, except that the amount of the polyfunctional compound 1,1,1-tris(4-hydroxyphenyl)ethane was in a molar ratio of 0.005 with respect to the bisphenol A, the molten prepolymer 4A was fed to a stirred-tank second polymerization reactor 3C with a volume of 50 liter at a flow rate of 3 liter/hr, the reaction temperature in the stirred-tank third polymerization reactor 3D, wire-contact fluidized first polymerization reactor 108A and wire-contact fluidized second polymerization reactor 108B was 255° C., and the reaction pressure in the wire-contact fluidized second polymerization reactor 108B was 150 Pa.

Example 4

A pelletized branched polycarbonate was obtained in the same manner as Example 1, except that the polyfunctional compound was 4-[4-[1,1-bis(4-hydroxyphenyl)ethyl]-α,α-dimethylbenzyl]phenol.

Example 5

A pelletized branched polycarbonate was obtained in the same manner as Example 1, except that the amount of the polyfunctional compound 1,1,1-tris(4-hydroxyphenyl)ethane was in a molar ratio of 0.003 with respect to the bisphenol A, the reaction temperature in the stirred-tank third polymerization reactor 3D, wire-contact fluidized first polymerization reactor 108A and wire-contact fluidized second polymerization reactor 108B was 269° C., and the reaction pressure in the wire-contact fluidized second polymerization reactor 108B was 180 Pa.

Example 6

A pelletized branched polycarbonate was obtained in the same manner as Example 1, except that the amount of the polyfunctional compound 1,1,1-tris(4-hydroxyphenyl)ethane was in a molar ratio of 0.0025 with respect to the bisphenol A, the reaction temperature in the stirred-tank third polymerization reactor 3D, wire-contact fluidized first polymerization reactor 108A and wire-contact fluidized second polymerization reactor 108B was 272° C., and the reaction pressure in the wire-contact fluidized second polymerization reactor 108B was 200 Pa.

Comparative Example 1

A pelletized branched polycarbonate was obtained in the same manner as Example 1, except that the amount of the polyfunctional compound 1,1,1-tris(4-hydroxyphenyl)ethane was in a molar ratio of 0.003 with respect to the bisphenol A, the reaction temperature in the stirred-tank third polymerization reactor 3D, wire-contact fluidized first polymerization reactor 108A and wire-contact fluidized second polymerization reactor 108B was 285° C., and the reaction pressure in the wire-contact fluidized second polymerization reactor 108B was 500 Pa.

Comparative Example 2

A pelletized branched polycarbonate was obtained in the same manner as Example 1, except that no polyfunctional compound was added, the molten prepolymer 4A was fed to a stirred-tank second polymerization reactor 3C with a volume of 50 liter at a flow rate of 3 liter/hr, the reaction temperature in the stirred-tank third polymerization reactor 3D, wire-contact fluidized first polymerization reactor 108A and wire-contact fluidized second polymerization reactor 108B was 285° C., and the reaction pressure in the wire-contact fluidized second polymerization reactor 108B was 800 Pa.

Comparative Example 3

A pelletized branched polycarbonate was obtained in the same manner as Example 3, except that no polyfunctional compound was added.

Comparative Example 4

A pelletized branched polycarbonate was obtained in the same manner as Example 1, except that the amount of the polyfunctional compound 1,1,1-tris(4-hydroxyphenyl)ethane was in a molar ratio of 0.013 with respect to the bisphenol A.

Comparative Example 5

A pelletized branched polycarbonate was obtained in the same manner as Example 3, except that the amount of the polyfunctional compound 1,1,1-tris(4-hydroxyphenyl)ethane was in a molar ratio of 0.001 with respect to the bisphenol A.

Comparative Example 6

A pelletized branched polycarbonate was obtained in the same manner as Example 1, except that no polyfunctional compound was added.

Comparative Example 7

A pelletized branched polycarbonate was obtained in the same manner as Example 1, except that the amount of the polyfunctional compound 1,1,1-tris(4-hydroxyphenyl)ethane was in a molar ratio of 0.003 with respect to the bisphenol A, a horizontal polymerization reactor was installed instead of the polymerization reactor 108B, the reaction temperature in the stirred-tank third polymerization reactor 3D, wire-contact fluidized first polymerization reactor 108A and horizontal polymerization reactor was 285° C., and the reaction pressure in the horizontal polymerization reactor was 150 Pa.

Comparative Example 8

A pelletized branched polycarbonate was obtained in the same manner as Example 1, except that no polyfunctional compound was added, the molten prepolymer 4A was fed to a stirred-tank second polymerization reactor 3C with a volume of 50 liter at a flow rate of 3 liter/hr, a horizontal polymerization reactor was installed instead of the polymerization reactor 108B, the reaction temperature in the stirred-tank third polymerization reactor 3D, wire-contact fluidized first polymerization reactor 108A and horizontal polymerization reactor was 285° C., and the reaction pressure in the horizontal polymerization reactor was 200 Pa.

The measured values in Examples 1-6 and Comparative Examples 1-8 are summarized in Table 1 and Table 2.

TABLE 1

|  | Example 1 | Example 2 | Example 3 | Example 4 | Example 5 | Example 6 |
|---|---|---|---|---|---|---|
| Mn of prepolymer 109A at the point of adding polyfunctional compound | 4000 | 4800 | 4500 | 4200 | 4200 | 4300 |
| MI (g/10 min) | 3.0 | 2.9 | 3.0 | 3.1 | 2.8 | 3.2 |
| Branched structure (a) content from polyfunctional compound (mol %) | 0.389 | 0.297 | 0.496 | 0.396 | 0.302 | 0.243 |

TABLE 1-continued

|  |  | Example 1 | Example 2 | Example 3 | Example 4 | Example 5 | Example 6 |
|---|---|---|---|---|---|---|---|
| Branched structure (b) content (mol %) | Branched structure of formula (2) | 0.149 | 0.255 | 0.068 | 0.152 | 0.179 | 0.195 |
|  | Branched structure of formula (3) | 0.007 | 0.013 | 0.007 | 0.009 | 0.021 | 0.050 |
|  | Branched structure of formula (4) | ND*1 | ND | ND | ND | 0.010 | 0.072 |
|  | Total for formulas (2) to (4) | 0.156 | 0.268 | 0.075 | 0.161 | 0.210 | 0.317 |
| (a) + (b) (mol %) |  | 0.545 | 0.565 | 0.571 | 0.557 | 0.512 | 0.560 |
| (b)/[(a) + (b)] |  | 0.29 | 0.47 | 0.13 | 0.29 | 0.41 | 0.57 |
| [Branched structure of formula (2)]/(b) |  | 0.96 | 0.95 | 0.91 | 0.94 | 0.85 | 0.62 |
| Hue ($\Delta$ b*) |  | 0.6 | 0.6 | 0.6 | 0.6 | 0.7 | 0.8 |
| Number of fisheyes |  | 18 | 19 | 16 | 14 | 29 | 52 |
| Moldability | 12 cm from bottom | A | A | A | A | A | A |
|  | 25 cm from bottom | A | A | A | A | A | A |
| Impact resistance | Bottle strength | A | A | A | A | A | A |
|  | Charpy strength (kJ/m$^2$) | 75 | 75 | 75 | 75 | 75 | 75 |

*1ND: "under the detection limit"

TABLE 2

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Mn of prepolymer 109A at the point of adding polyfunctional compound |  | 4200 | 4400 | 4500 | 4100 | 4500 | 4000 | 4200 | 4200 |
| MI (g/10 min) |  | 3.1 | 3.0 | 2.9 | 3.2 | 2.8 | 3.0 | 2.9 | 3.0 |
| Branched structure (a) content from polyfunctional compound (mol %) |  | 0.287 | 0 | 0 | 1.267 | 0.098 | 0 | 0.291 | 0 |
| Branched structure (b) content (mol %) | Branched structure of formula (2) | 0.112 | 0.258 | 0.071 | 0.126 | 0.069 | 0.145 | 0.135 | 0.241 |
|  | Branched structure of formula (3) | 0.081 | 0.115 | 0.003 | 0.008 | 0.007 | 0.009 | 0.089 | 0.126 |
|  | Branched structure of formula (4) | 0.171 | 0.276 | ND | ND | ND | ND | 0.173 | 0.291 |
|  | Total for formulas (2) to (4) | 0.364 | 0.649 | 0.074 | 0.134 | 0.076 | 0.154 | 0.397 | 0.658 |
| (a) + (b) (mol %) |  | 0.651 | 0.649 | 0.074 | 1.401 | 0.174 | 0.154 | 0.688 | 0.658 |
| (b)/[(a) + (b)] |  | 0.56 | 1.00 | 1.00 | 0.10 | 0.44 | 1.00 | 0.58 | 1.00 |
| [Branched structure of formula (2)]/(b) |  | 0.31 | 0.40 | 0.96 | 0.94 | 0.91 | 0.94 | 0.34 | 0.37 |
| Hue ($\Delta$ b*) |  | 1.1 | 1.3 | 0.6 | 0.7 | 0.7 | 0.6 | 1.4 | 1.5 |
| Number of fisheyes |  | 145 | 165 | 26 | 263 | 23 | 21 | 168 | 188 |
| Moldability | 12 cm from bottom | A | B | C | A | B | B | A | B |
|  | 25 cm from bottom | A | B | C | A | B | B | A | B |
| Impact resistance | Bottle strength | C | C | — | C | A | A | C | C |
|  | Charpy strength (kJ/m$^2$) | 65 | 65 | 75 | 55 | 75 | 75 | 65 | 65 |

INDUSTRIAL APPLICABILITY

The present invention provides branched polycarbonates produced by transesterification, which have excellent impact resistance, low fisheyes, excellent hue and improved moldability, and they can be suitably used for large-sized blow molding, extrusion molding, profile extrusion and hollow sheet forming.

REFERENCE SIGNS LIST

1A, 1B: polymerization material inlets, 1C, 1D: prepolymer inlets, 2A, 2B, 2C, 2D, 105A, 105B: vent ports, 3A, 3B: stirred-tank first polymerization reactors (A), (B), 3C: stirred-tank second polymerization reactor (C), 3D: stirred-tank third polymerization reactor (D), 4A, 4B, 4C, 4D, 109A: molten prepolymers, 5A, 5B, 5C, 5D, 107A, 107B: outlets, 6A, 6B, 6C, 6D: stirrers, 7C, 7D, 8, 106A: transport pumps, 101A, 101B: prepolymer inlets, 102A, 102B: perforated plates, 103A, 103B: wire guides, 104A, 104B: gas supply ports, 106B: discharge pump, 108A: wire-contact fluidized first polymerization reactor, 108B: wire-contact fluidized second polymerization reactor, 109B: molten polymer.

The invention claimed is:

1. A branched polycarbonate having a branching derived from a polyfunctional compound having in the molecule at least 3 functional groups that are reactive with a carbonic acid diester, the branched polycarbonate having a repeating unit represented by general formula (1) on the main chain and branched chains and comprising a branched structure (a) derived from the polyfunctional compounds directly bonded to the main chain and branched chains and a branched structure (b) including at least one selected from the group consisting of branched structures represented by general formulas (2), (3) and (4), wherein:

the total amount of substance with branched structure (a) and branched structure (b) with respect to the amount of substance of the repeating unit represented by general formula (1) is 0.2-1.0 mol %, the ratio of the amount of substance with branched structure (b) with respect to the total amount of substance with branched structure (a) and branched structure (b) is 0.1-0.6, and the ratio of the amount of substance with the branched structure represented by general formula (2) with respect to the amount of substance with branched structure (b) is 0.5 or greater,

[Chemical Formula 1]

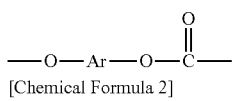

(1)

[Chemical Formula 2]

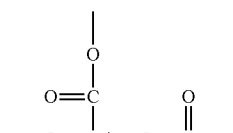

(2)

[Chemical Formula 3]

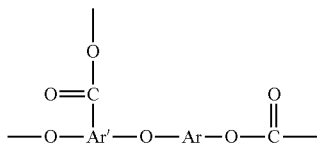

(3)

[Chemical Formula 4]

(4)

[In formulas (1), (2), (3) and (4), Ar represents a divalent aromatic residue and Ar' represents a trivalent aromatic residue.]

2. The branched polycarbonate according to claim 1, wherein the ratio of the amount of substance with the branched structure represented by formula (4) with respect to the amount of substance with branched structure (b) is no greater than 0.25.

3. The branched polycarbonate according to claim 1, wherein the polyfunctional compound is a compound having at least 3 phenolic hydroxyl and/or carboxyl groups.

4. The branched polycarbonate according to claim 1, wherein:
the polyfunctional compound is 1,1,1-tris(4-hydroxyphenyl)ethane and/or 4-[4-[1,1-bis(4-hydroxyphenyl)ethyl]-α,α-dimethylbenzyl]phenol, and
the branched structures represented by general formulas (2), (3) and (4) are the branched structures represented by formulas (5), (6) and (7), respectively.

[Chemical Formula 5]

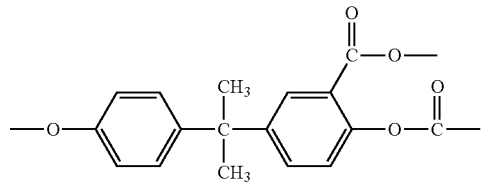

(5)

[Chemical Formula 6]

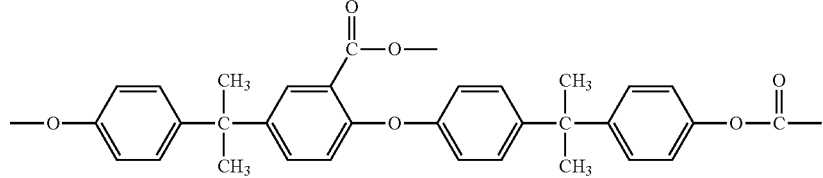

(6)

[Chemical Formula 7]

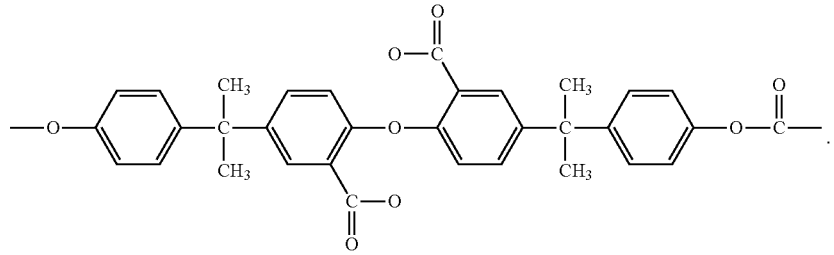

(7)

5. A container obtained by blow molding the branched polycarbonate according to claim 1.

6. The container according to claim 5, wherein the value of the maximum thickness divided by the minimum thickness ranges from 1.0 or more to less than 2.0, the thickness are measured following the face parallel to the bottom face of the container.

* * * * *